United States Patent
Fox et al.

(10) Patent No.: US 8,980,173 B2
(45) Date of Patent: Mar. 17, 2015

(54) SYSTEMS AND METHODS FOR MONITORING AND CONTROLLING CORROSION IN HOT WATER SYSTEMS

(71) Applicant: Nalco Company, Naperville, IL (US)

(72) Inventors: Jeffrey V. Fox, Springsboro, OH (US); George T. Totura, Naperville, IL (US); Peter Hicks, Aurora, IL (US); David A. Grattan, Bolingbrook, IL (US); Martin Godfrey, Eagan, MN (US)

(73) Assignee: Nalco Company, Naperville, IL (US)

( * ) Notice: Subject to any disclaimer, the term of this patent is extended or adjusted under 35 U.S.C. 154(b) by 58 days.

(21) Appl. No.: 13/773,353

(22) Filed: Feb. 21, 2013

(65) Prior Publication Data

US 2013/0161265 A1   Jun. 27, 2013

Related U.S. Application Data

(63) Continuation-in-part of application No. 13/442,324, filed on Apr. 9, 2012, now Pat. No. 8,771,593, which is a continuation-in-part of application No. 11/782,192, filed on Jul. 24, 2007, now Pat. No. 8,153,057, (Continued)

(51) Int. Cl.
*B08B 17/00* (2006.01)
*C23F 11/04* (2006.01)
(Continued)

(52) U.S. Cl.
CPC ............... *C02F 1/722* (2013.01); *C23F 11/08* (2013.01); *F22B 37/025* (2013.01);
(Continued)

(58) Field of Classification Search
CPC ............. C02F 1/042; C02F 1/70; C02F 1/72; C23F 4/00; C23F 11/00
USPC .......... 422/3, 6–7, 12–14, 105, 119; 210/721, 210/758; 134/22.1, 166 R
See application file for complete search history.

(56) References Cited

U.S. PATENT DOCUMENTS

| 4,261,803 A | 4/1981 | Suhara et al. |
| 4,269,717 A | 5/1981 | Slovinsky |

(Continued)

FOREIGN PATENT DOCUMENTS

| JP | 10213562 | 8/1998 |
| JP | 10213562 A | 8/1998 |

(Continued)

OTHER PUBLICATIONS

Buecker B., "Water Treatment: The Continuing Battle Against FAC," Power Engineering, Pennwell Publishing Co., Tulsa, OK, pp. 32-34, vol. 106, No. 9, Sep. 1, 2002.

(Continued)

*Primary Examiner* — Monzer R Chorbaji
(74) *Attorney, Agent, or Firm* — Edward O. Yonter

(57) ABSTRACT

Disclosed are systems and methods for monitoring and controlling a real-time oxidation-reduction potential in a hot water system to inhibit corrosion in the hot water system. The method includes defining one or more operational protective zones in the hot water system. One or more of the operational protective zones includes an oxidation-reduction potential probe that is operable to measure a real-time oxidation-reduction potential in the hot water system at operating temperature and pressure. The probe transmits the measured real-time potential to the controller, which assesses and interprets the transmitted potential to determine whether it conforms to an oxidation-reduction potential setting. If the measured potential does not conform the oxidation-reduction potential setting, the controller is operable to feed or remove one or more active chemical species into or from the hot water system and further operable to change at least one system parameter.

20 Claims, 13 Drawing Sheets

Related U.S. Application Data application No. 13/773,353, which is a continuation-in-part of application No. 12/114,288, filed on May 2, 2008, now Pat. No. 8,658,095, which is a continuation-in-part of application No. 11/668,048, filed on Jan. 29, 2007, now Pat. No. 8,658,094, application No. 13/773,353, which is a continuation-in-part of application No. 11/668,048, filed on Jan. 29, 2007, now Pat. No. 8,658,094.

(51) Int. Cl.

| | | |
|---|---|---|
| *G01D 11/26* | (2006.01) | |
| *B01D 21/00* | (2006.01) | |
| *B08B 9/00* | (2006.01) | |
| *C02F 1/72* | (2006.01) | |
| *C23F 11/08* | (2006.01) | |
| *F22B 37/02* | (2006.01) | |
| *F22D 11/00* | (2006.01) | |
| *G05D 21/02* | (2006.01) | |
| *C02F 1/70* | (2006.01) | |

(52) U.S. Cl.
CPC ............ *F22D 11/006* (2013.01); *G05D 21/02* (2013.01); *C02F 1/70* (2013.01); *C02F 1/72* (2013.01); *C02F 2209/006* (2013.01); *C02F 2209/04* (2013.01); *C02F 2303/08* (2013.01)
USPC .......... 422/7; 422/3; 422/6; 422/12; 422/105; 422/119; 210/721; 210/758; 134/22.1

(56) References Cited

U.S. PATENT DOCUMENTS

| | | | |
|---|---|---|---|
| 4,574,071 A | 3/1986 | DeSilva et al. | |
| 4,648,043 A | 3/1987 | O'Leary | |
| 4,775,005 A | 10/1988 | Beyer et al. | |
| 4,830,757 A | 5/1989 | Lynch et al. | |
| 5,023,000 A | 6/1991 | Kneller et al. | |
| 5,236,845 A | 8/1993 | Pierce et al. | |
| 5,238,846 A | 8/1993 | Aucutt | |
| 5,243,297 A | 9/1993 | Perkins et al. | |
| 5,268,092 A | 12/1993 | Eden | |
| 5,332,494 A | 7/1994 | Eden et al. | |
| 5,342,510 A | 8/1994 | Eden et al. | |
| 5,348,664 A | 9/1994 | Kim et al. | |
| 5,422,014 A | 6/1995 | Allen et al. | |
| 5,470,484 A | 11/1995 | McNeel | |
| 5,578,273 A * | 11/1996 | Hanson et al. | 422/110 |
| 5,747,342 A | 5/1998 | Zupanovich | |
| 5,849,220 A | 12/1998 | Batton et al. | |
| 5,855,791 A | 1/1999 | Hays et al. | |
| 6,068,012 A | 5/2000 | Beardwood et al. | |
| 6,077,445 A | 6/2000 | Ascolese | |
| 6,336,058 B1 | 1/2002 | Fowee | |
| 6,350,376 B1 | 2/2002 | Imaoka et al. | |
| 6,391,256 B1 | 5/2002 | Moon et al. | |
| 6,402,984 B1 | 6/2002 | Nakajima et al. | |
| 6,409,926 B1 | 6/2002 | Martin | |
| 6,418,958 B1 | 7/2002 | Rossi et al. | |
| 6,436,711 B1 | 8/2002 | Davis et al. | |
| 6,510,368 B1 | 1/2003 | Beardwood et al. | |
| 6,566,139 B2 | 5/2003 | Davis et al. | |
| 6,587,753 B2 | 7/2003 | Fowee | |
| 6,609,070 B1 | 8/2003 | Lueck | |
| 6,620,315 B2 | 9/2003 | Martin | |
| 6,813,532 B2 | 11/2004 | Eryurek et al. | |
| 7,141,175 B2 | 11/2006 | Verma | |
| 7,208,117 B2 * | 4/2007 | Hays et al. | 422/3 |
| 7,666,312 B2 | 2/2010 | Hicks | |
| 2003/0004681 A1 | 1/2003 | Fandrich et al. | |
| 2006/0006122 A1 | 1/2006 | Burns et al. | |
| 2006/0157420 A1 | 7/2006 | Hays et al. | |
| 2006/0169646 A1 | 8/2006 | Andree et al. | |
| 2008/0179179 A1 | 7/2008 | Hicks et al. | |
| 2008/0202553 A1 | 8/2008 | Hicks et al. | |

FOREIGN PATENT DOCUMENTS

| | | |
|---|---|---|
| JP | 2003254503 | 9/2003 |
| JP | 2003254503 A | 9/2003 |
| JP | 2005233737 | 9/2005 |
| WO | 0159535 | 8/2001 |
| WO | 02101344 | 12/2002 |

OTHER PUBLICATIONS

Dedekind et al., "Oxygenated Feedwater Treatment at the World's Largest Fossil Fired Power Plant—Beware the Pitfall," Power Plant Chemistry, vol. 3, No. 11, Nov. 2001.

Filer, "Power Plant Chemistry Measurement Advancements: Oxidation Reduction Potential," Ultrapure Water, Nov. 1998.

Haag, J. et al., "On-Line Measurement of Redox and Corrosion Potentials in Water for PWR Steam Generators," Kraftwerkstechnik, Kraftwerkstechnik GMbH, Essen, DE, pp. 236-241, vol. 70, No. 3, Mar. 1, 1990.

Niedrach, L. W., "Electrodes for Potential Measurements in Aqueous Systems at High Temperatures and Pressures," Angewandte Chemie—International Edition in English, pp. 161-169, vol. 26, No. 3, Mar. 1987.

Uchino et al.. "Study on the Practical Application of a Method for Corrosion Potential Measurement in a Water Quality Monitoring System used During Combined Water Treatment." PowerPlant Chemistry, pp. 511-517,vol. 3, No. 9, 2001.

Margulova, T. Kh. et al. "Conditions of dosing oxygen and hydrogen peroxide into the condensate of power units of supercriitical parameters." (Abstract), Teploenergetika (Moscow), 55-9, (6) 1977.

Pike, T.H. et al. "An Improved Method for Monitoring Low Concentrations of Volatile Oxygen Scavengers", Iwc, pp. 64-67, Jan. 2008.

Dooley, B. et al. "ORP—The Real Story for Fossil Plants", PowerPiant Chemistry, pp. 5-15, 5 (1), 2003.

International Search Report mailed May 27, 2014 for related PCT application PCT/US2014/014920. (10 Pages).

* cited by examiner

SYSTEMS AND METHODS FOR MONITORING AND CONTROLLING CORROSION IN HOT WATER SYSTEMS

CROSS-REFERENCE TO RELATED APPLICATIONS

This is a continuation-in-part of prior application Ser. No. 13/442,324, filed Apr. 9, 2012, which is a continuation-in-part of prior application Ser. No. 11/782,192, filed Jul. 24, 2007, now U.S. Pat. No. 8,153,057. This application is also a continuation-in-part of prior application Ser. No. 12/114,288, filed May 2, 2008, which is a continuation-in-part of prior application Ser. No. 11/668,048, filed Jan. 29, 2007. This application is also a continuation-in-part of prior application Ser. No. 11/668,048, filed Jan. 29, 2007. The entire contents of each of the foregoing applications and patents are hereby incorporated by reference.

TECHNICAL FIELD

This invention relates generally to systems and methods for monitoring and controlling corrosion in hot water systems. More specifically, the invention relates to measuring real-time oxidation-reduction potential at operating temperature and pressure in one or more operational protective zones and using those measurements to control feed of active chemical species. The invention has particular relevance to locally and/or globally monitoring and controlling corrosion in simple or complex hot water systems.

BACKGROUND

Hot water systems are generally composed of all-ferrous metallurgy or mixed metallurgy, such as copper or copper alloy systems, nickel and nickel-based alloys, and stainless steel and may also be mixed with mild steel components. Many general classes/components of hot water systems exist, such as boilers, hot water heaters, heat exchangers, steam generators, nuclear power electric systems combustion engine and diesel coolant systems, evaporator systems, thermal desalination systems, papermaking operations, fermentation processes, the like, and attached ancillary devices. They are dynamic operating systems that undergo a myriad of REDOX Stress events (i.e., any electrochemical event in the hot water system related to changes in oxidative or reductive potential). Such events generally include any process that implicates the oxidation-reduction potential ("ORP") space or regime in the system.

These events result from a multitude of factors including leaks from various components, contamination from air in-leakage, malfunctioning pumps, seals, vacuum lines, and gauges. Further, increased use of oxygen-enriched water, such as boiler make-up water, returned steam condensate, and/or raw surface or subsurface water, deaerator malfunctions, steam and turbine load swings, and problems with chemical feed pumps cause unplanned reduction or increase in chemical treatment feed rates. Uncontrolled REDOX Stress events can cause serious corrosion problems, such as localized corrosion, stress corrosion, corrosion fatigue, and/or flow accelerated corrosion problems in hot water systems. By their nature, these problems tend to be electrochemical and thus tied-in to the oxidative-reductive properties of the environment and structural material interaction. Moreover, corrosion problems may be exacerbated if a pH of the hot water strays from a targeted control range.

Although some conventional methods are practiced today to identify REDOX Stress events in hot water systems, because of hot water system dynamics most REDOX Stress events are unpredictable. For example, boiler water temperatures can range from about 240° C. at about 6 MPa to about 310° C. at about 10 MPa; at these high temperatures, chemical reactions can occur quickly. Conventional methods have inherent drawbacks (see below) at such conditions, and therefore are not widely practiced. As a consequence, the majority of REDOX Stress events go undetected and thus uncorrected. Uncontrolled REDOX Stress events can lead to serious corrosion problems in these systems, which negatively impact plant equipment life expectancy, reliability, production capability, safety, environmental regulations, capital outlay, and total plant operation costs.

Identifying REDOX Stress events and monitoring pH of the hot water currently includes both online instruments and grab sample wet chemical analysis test methods. In both approaches, the sample has to first undergo sample conditioning, such as cooling, prior to measurement. Examples of online instruments include dissolved oxygen meters, cation conductivity instruments, room temperature ORP instruments, pH instruments, sodium analyzers, hardness analyzers, specific conductivity meters, silica analyzers, particle and turbidity meters, reductant analyzers, and the like. General corrosion monitoring, such as coupon and electrochemical analysis, is typically performed after cooling a sample or at elevated temperatures. Grab sample test methods include analyzing for dissolved oxygen, pH, hardness, silica conductivity, total and soluble iron, copper, and silica, reductant excess, and the like.

Some drawbacks of these methods include the following. Grab sample analysis gives a single point in time measurement and consequently is not a viable continuous monitoring method for REDOX Stress events or the pH of the hot water. It also often has inadequately low-level detection limits. Moreover, a pH reading from a grab sample analysis in a cooled sample stream may need to be corrected to account for the temperature variation.

Online monitors do not provide a direct measurement of REDOX Stress and thus cannot indicate whether or not a REDOX Stress event is occurring at any particular time. Corrosion monitors detect general corrosion, but are not capable of measuring changes in local corrosion rates caused by REDOX Stress events. Online reductant analyzers measure the amount of reductant, but not the net REDOX Stress a system is undergoing at system temperature and pressure. That REDOX Stress can occur in the apparent presence of a reductant is thus another drawback of this technique.

Dissolved oxygen ("DO") meters have similar drawbacks. Measuring the amount of DO (an oxidant) but not necessarily the net REDOX Stress a system is undergoing is not an accurate indicator of corrosion stress. The sample also must be cooled prior to DO measurement thus increasing the lag time in detecting when the REDOX Stress event started. Further, the potential for oxygen consumption in the sample line could cause inaccurate readings. REDOX Stress can also occur in the apparent absence of DO and little or no DO in the sample could potentially be a false negative. In addition, all of the instruments described above are relatively costly to purchase, and require frequent calibration and maintenance.

Corrosion coupons give a time-averaged result of general system corrosion. Again, this technique does not offer a real-time indication or control of REDOX Stress events. Online electrochemical corrosion tools are inadequate for localized corrosion determinations and cannot be used in low conductivity environments.

Room temperature ORP is a direct measurement of the net ORP of a sample taken from the system. A drawback of this technique is that it fails to indicate what is happening at system temperature and pressure. REDOX Stress events that occur at operating temperature and pressure often cannot be observed at room temperature, as process kinetics and thermodynamics vary with temperature. In addition, room temperature ORP measuring devices are more sluggish and more likely to become polarized. Reliability of such devices is poor and they need frequent calibration and maintenance.

There thus exists an ongoing need to develop methods of accurately monitoring and controlling real-time ORP and pH in hot water systems at operating temperature and pressure.

SUMMARY

This disclosure accordingly provides systems and methods for monitoring and controlling ORP and pH in a hot water system in real-time at operating temperature and pressure. A myriad of processes occurring in a hot water system contribute to the ORP, which in turn acts as a REDOX Stress indicator for the hot water system. In contrast to conventional room temperature measurements, ORP measurements taken in real-time at system operating temperature and pressure are capable of indicating primary and secondary REDOX Stress events occurring in the system and the pH of the hot water, all in real-time. Such real-time ORP monitoring may be used to measure, identify, and assess REDOX Stress demands in the system and the pH of the hot water, and therefore can act as a direct or indirect corrosion process indicator.

In an aspect, the invention provides a system for monitoring and controlling corrosion in a boiler. The system includes an oxidation-reduction potential probe and a controller unit. The oxidation-reduction potential probe is capable of measuring a reduction potential of a boiler water substantially in real time. The controller unit is operatively coupled to the oxidation-reduction potential probe, and activates at least one water treatment chemical in response to the measured reduction potential so as to maintain a pH within a predetermined range.

In another aspect, the invention provides a method of monitoring and controlling corrosion in a hot water system. The method includes measuring a reduction potential of a hot water substantially in real time using an oxidation-reduction potential probe, and activating at least one water treatment chemical in response to the measured reduction potential so as to maintain a pH within a predetermined range.

It is an advantage of the invention to provide a method of inhibiting corrosion in a hot water system based upon measuring a real-time ORP at operating temperature and pressure in the hot water system and reacting to the measured ORP by feeding one or more active chemical species into the hot water system to maintain an ORP setting and/or pH of the hot water.

Another advantage of the invention is to provide a hot water system corrosion control device including a receiver, a processor, a transmitter, and a feeding device, which work in unison to control a real-time ORP and/or pH in one or more operational protective zones in the hot water system.

A further advantage of the invention is to increase hot water system efficiency by enabling improved maintenance and control of system parameters.

Yet another advantage of the invention is to decrease operating costs for a variety of hot water systems and components by accurately preventing corrosion.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION

Figure 1:
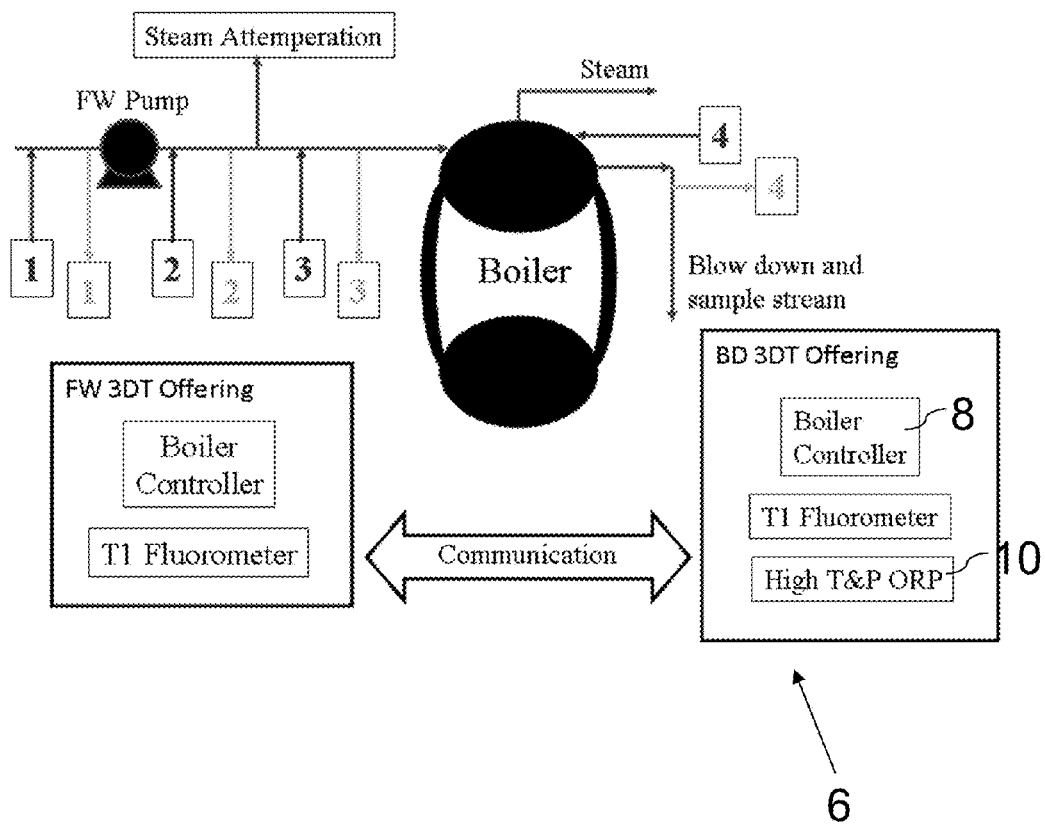
FIG. 1 is a schematic illustration of an ORP measurement and monitoring system 6 according to one embodiment of the invention, illustrating an oxidation-reduction potential measuring device 10 and a controller unit 8.

Described herein are systems and methods for monitoring and controlling real-time ORP and pH in hot water systems at operating temperature and pressure. The systems and methods can be advantageous in preventing corrosion of the hot water systems and components. The system includes an oxidation-reduction potential probe and a controller unit. The oxidation-reduction potential probe is capable of measuring a reduction potential of the hot water substantially in real time. The controller unit is operatively coupled to the oxidation-reduction potential probe, and activates at least one water treatment chemical in response to the measured reduction potential so as to maintain a pH within a predetermined range.

I) Definitions

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Unless expressly stated to the contrary, use of the term "a" is intended to include "at least one" or "one or more." For example, "a device" is intended to include "at least one device" or "one or more devices."

As used herein, "hot water system," "system," and like terms refer to any system where hot water is in contact with metallic surfaces, including for example an oil extraction system. "Hot water" means water having a temperature from about 37° C. up to about 370° C. The system may operate at or below atmospheric pressure or a pressure up to about 4,000 psi.

"ORP," "@T ORP," "at-T ORP," and "real-time ORP" refer to oxidation-reduction potential for an industrial water system at operating temperature and pressure. In certain instances herein, ORP is indicated as room temperature ORP.

"ORP measuring device" and "ORP probe" refer to any device capable of measuring and transmitting a real-time ORP signal. Though any suitable device may be used, a preferred device is disclosed in U.S. patent application Ser. No. 11/668,048, entitled "High Temperature and Pressure Oxidation-Reduction Potential Measuring and Monitoring Device for Hot Water Systems," published as U.S. Publication No. 2008/0179179 on Jul. 31, 2008, and U.S. patent application Ser. No. 12/114,288, entitled "High Temperature and Pressure Oxidation-Reduction Potential Measuring and Monitoring Device for Hot Water Systems," published as U.S. Publication No. 2008/0202553 on Aug. 28, 2008, each of which is incorporated herein by reference in its entirety. Typically, the ORP probe includes a temperature detector, a noble metal electrode, and a reference electrode.

"Active chemical species" refers to oxidants, reductants, corrosion-inhibitors, corrodants, and other species that have an effect on or influence the ORP in a hot water system. Such species are described in more detail below.

"REDOX Stress" refers to any electrochemical event in a hot water system related to changes in oxidative or reductive potential, either directly or indirectly.

"Controller system," "controller," and similar terms refer to a manual operator or an electronic device having components such as a processor, memory device, digital storage medium, cathode ray tube, liquid crystal display, plasma display, touch screen, or other monitor, and/or other components. In certain instances, the controller may be operable for integration with one or more application-specific integrated circuits, programs, computer-executable instructions, or algorithms, one or more hard-wired devices, wireless devices, and/or one or more mechanical devices. Some or all of the controller system functions may be at a central location, such as a network server, for communication over a local area network, wide area network, wireless network, internet connection, microwave link, infrared link, and the like. In addition, other components such as a signal conditioner or system monitor may be included to facilitate signal-processing algorithms.

"pH Altering Species" and similar terms refers to any agent that alters the activity and concentration of hydrogen ions in solution. These agents may be a strong acid or base such as HCl or NaOH or may be weak acids and bases such as acetic acid or ammonium. Exemplified pH altering species may be phosphates ($CaPO_4$, $MgPO_4$). Other representative non-limiting examples of pH Altering Species include ammonia and amines, such as cyclohexylamine, Morpholine, diethylaminoethanol (DEAE), methoxypropylamine, monoethanolamine, the like, and combinations thereof, metal hydroxides like sodium, lithium, potassium, magnesium and calcium, acids like sulfuric, hydrochloric, phosphoric, nitric, boric, acetic, oxalic, erythorbic, ascorbic, tartronic, gallic, and material containing phosphates like mono, di and tri sodium phosphate.

"REDOX altering chemicals" and similar terms refers to any element or compound in a reduction-oxidation (redox) reaction that donates an electron to another species. Other representative non-limiting examples of REDOX altering chemicals include hydrazine, sulfite, carbohyrazide, N,N-diethylhydroxylamine, hydroquinone, erythorbate, methyl ethyl ketoxime, hydroxylamine, tartronic acid, ethoxyquin, methyltetrazone, tetramethylphenylenediamine, semi-carbazides, diethylaminoethanal, 2-ketogluconate, N-isopropylhydroxylamine, ascorbic acid, gallic acid, and hydroxyacetone, fluorine, oxygen, chlorine, hypochlorite, bromine, iodine, ozone, hydrogen peroxide, hydrogen, nitrite, nitrate, chromate, permanganate, metal hydrides (NaH, $CaH_2$, and $LiAlH_4$, for example), and sulfides (like hydrogen sulfide).

II) ORP Measurement and Monitoring System

The present invention is directed to a system for monitoring and controlling real-time ORP and pH in hot water systems at operating temperature and pressure. Referring to FIG. 1, the hot water system generally includes one or more feed water ("FW") pumps and a steam producer (e.g., a boiler). The steam producer receives the feed water and generates steam for subsequent use in various processes, and discharges hot water via a blow-down line. The ORP measurement and monitoring system 6 (hereinafter referred to as the "ORP system") is positioned within the blow-down line or a side sample stream, and includes an ORP measurement and monitoring device or probe 10 (hereinafter referred to as the "ORP measuring device") and a controller unit 8. The ORP measuring device 10 is capable of measuring a reduction potential of the hot water substantially in real time. The controller unit 8 is operatively coupled to the ORP measuring device 10, and activates at least one water treatment chemical in response to the measured reduction potential so as to maintain a pH within a predetermined range.

A) ORP Measuring Device

Figure 2:
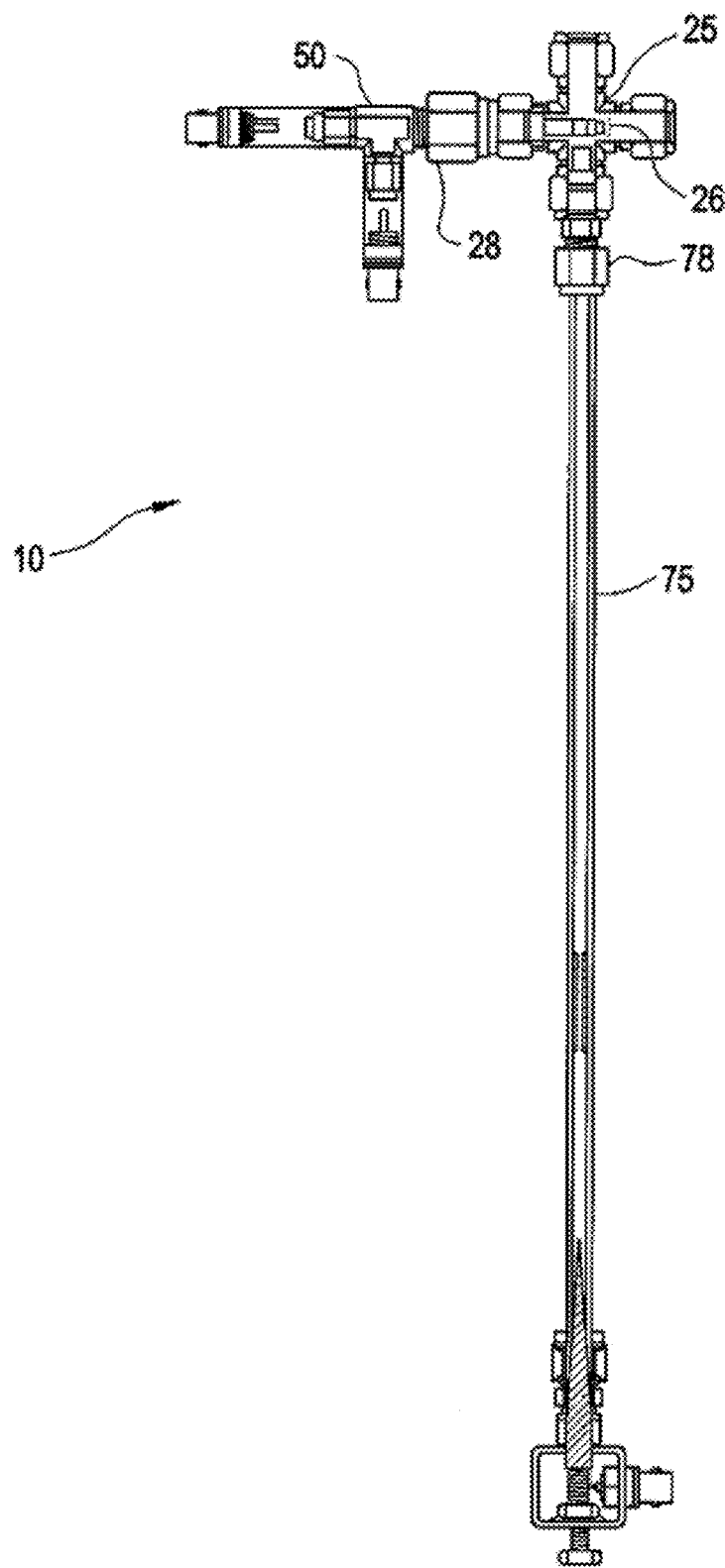
FIG. 2 is a side view of the ORP measuring device 10 of FIG. 1, shown with flow-through cell 25, union tee 50, and external pressure-balanced reference electrode assembly 75.
Figure 3:
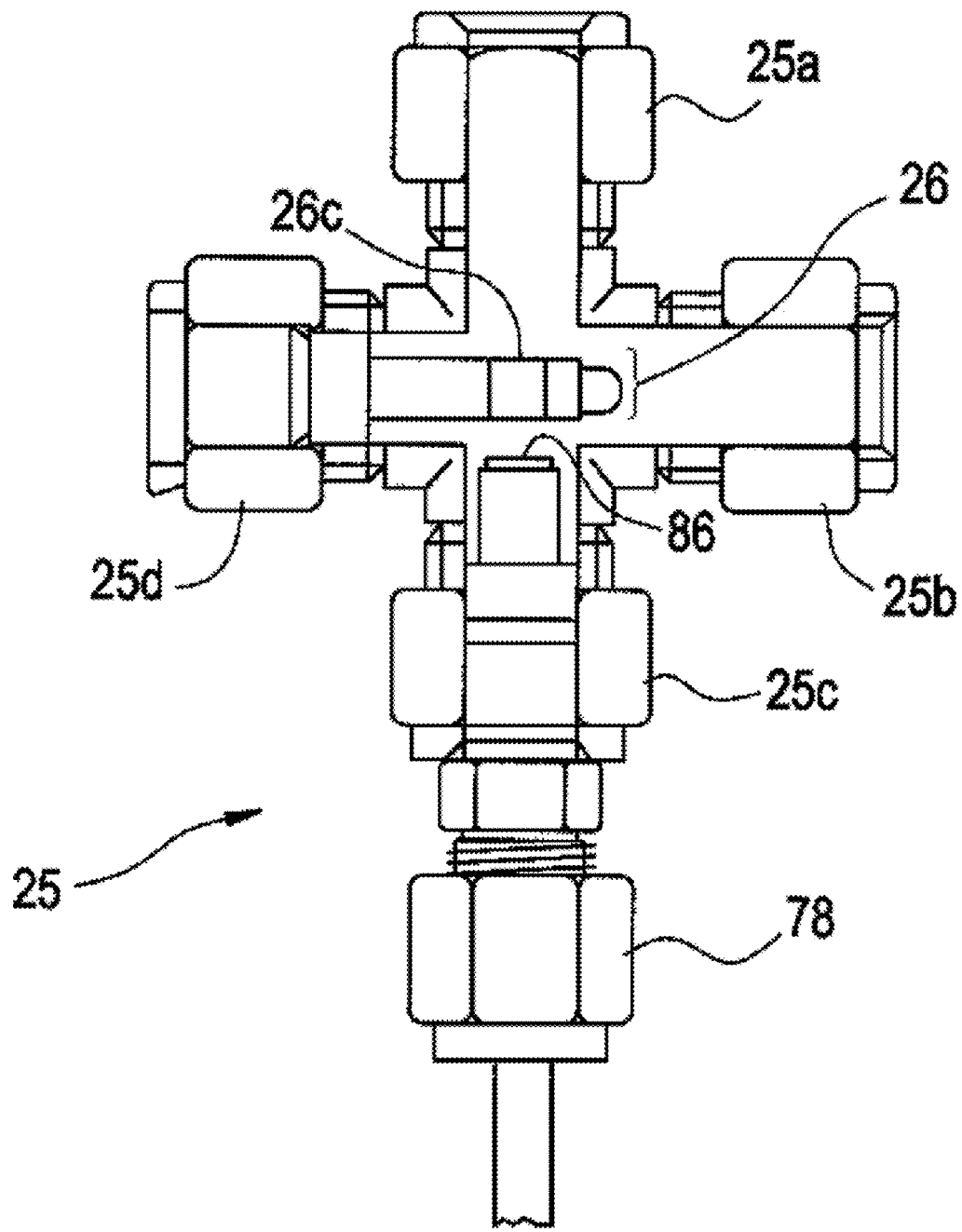
FIG. 3 is a schematic diagram of an embodiment of the flow-through cell 25 of FIG. 2, having ports 25a, 25b, 25c, and 25d, sensor 26, high-pressure fitting 78, and coupler 28.

Referring to FIGS. 2 and 3, preferred embodiments of the ORP measuring device 10 are illustrated and explained, where like numerals denote like components. In FIG. 2, an embodiment of ORP measuring device 10 is shown with flow-through cell 25, sensor 26, union tee 50, and external pressure-balanced reference electrode assembly 75. The flow-through cell ("FTC") typically is the "foundation" of the ORP measuring device 10 to which other components are connected, including the temperature detector, sensor, and external pressure-balanced reference electrode assembly ("EPBRE"). In alternative embodiments, however, other components may be separate from the FTC and thus not directly connected to the FTC. In this embodiment, coupler 28 connects the FTC to the union tee and fitting 78 connects the FTC to the EPBRE.

Preferred fasteners include ¼ or ⅜ inch NPT fittings for coupler 28 and fitting 78. These connectors may be any suitable size and the examples herein are not intended to be limiting. For instance, a ⅜ inch female adaptor may be used for coupler 28, such as Part No. SS-6-TA-7-4, and reducing union Part No. SS-400-R-6BT may be used for fitting 78 (both available from Swagelok® in Solon, Ohio). In this embodiment, the EPBRE is illustrated "hanging" underneath and vertically with respect to the FTC. Such a vertical configuration is one embodiment and it should be appreciated that the EPBRE may be positioned at any angle relative to the FTC according to alternative embodiments. Preferably, the ORP device is installed so that the EPBRE points directly downward and towards the ground. This downward position maintains the EPBRE base at ambient temperature and ensures against bubble formation within the electrolyte solution (explained below). If the base of the EPBRE is not at ambient temperature, corrections are typically made to adjust for thermal potentials within the electrode. The temperature of the base of the EPBRE may be determined using any suitable temperature-sensing device.

FIG. 3 illustrates a preferred embodiment of FTC 25. Though this schematic illustrates an embodiment having four ports, 25a to 25d, it is envisioned that the FTC may have additional ports such as for attaching or adding other components or for accommodating additional inflows and/or outflows. Some or all ports may be internally or externally connected or separate. An example of a preferred four-port FTC is ⅜ inch tube fitting, union cross Part No. SS-600-4 (available from Swagelok® in Solon, Ohio). In a preferred embodiment, the FTC is constructed of the ⅜ inch stainless steel cross and includes a bored-through configuration having 4 connected ports. It is contemplated that the bore size and other dimensions of the FTC may be chosen to accommodate any possible flowrate, as determined for each application. Preferred and typical flowrates include from about 50 ml/min to about 1,000 ml/min. More preferred flowrates are from about 100 ml/min to about 500 ml/min.

As shown in FIG. 3, inflow port 25b accommodates a water inflow from the hot water system and outflow port 25a directs the water back into the system or into a waste stream. In alternative embodiments, valves or other flow control devices may be used to control inflow and outflow into the FTC. One embodiment of such a flow control system is illustrated and explained in FIG. 9 below. It should be appreciated that the invention may include more than one inflow and/or outflow port, which may be configured to work in unison, independently controllable, or configured and operated in any suitable fashion. Port 25c in this embodiment includes high-pressure fitting 78 that connects the FTC to the EPBRE.

In an embodiment, sensor 26 is associated with the FTC and protrudes into near the center of the FTC. In one embodiment, the sensor includes an ORP probe. In another embodiment, the sensor includes a temperature detector. In a further embodiment, the sensor includes both the ORP probe and the temperature detector. In an embodiment, the temperature detector is a temperature-dependent resistance sensor, described in more detail below. When the water inflow contacts the ORP probe, for example, an ORP signal is produced between the ORP probe and the reference electrode that is relayed to the control system. The ORP probe is typically positioned in relation to porous frit 86, as explained in more detail below. Preferred materials for the porous frit include ceramic or electroceramic materials, such as zirconia, polymeric materials, the like, or any other suitable porous material. It is preferred that the porous frit be inert to hot water system processes and ORP signal measurement.

Figure 4:
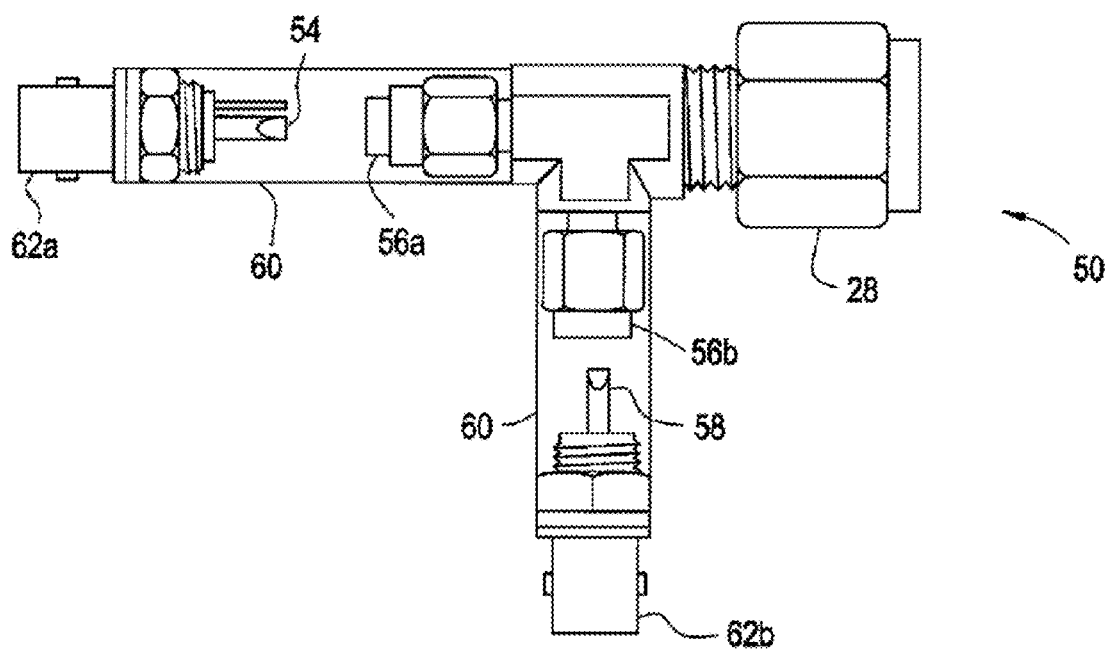
FIG. 4 is a schematic diagram of an embodiment of the union tee 50 of FIG. 2.

In FIG. 4, an embodiment of union tee 50 is shown including coupler 28, temperature detector electrical connection 54, ferrules 56a and 56b, ORP probe connection 58, L-bracket 60, and BNC connectors 62a and 62b. Coupler 28 connects the FTC at port 25d to the union tee. A preferred connector for coupler 28 is Part No. SS-6-TA-7-4 (available from Swagelok® in Solon, Ohio). In a preferred embodiment, the union tee includes two ⅛ inch tube connectors having a ¼ inch NPT connector on the remaining end that connects to coupler 28. In an embodiment, the union tee is mounted on or attached to the L-bracket or other stabilizing device or attachment. In alternative embodiments, the union tee may have other suitably sized fittings, which may be standard, metric, small, large, or any suitable configuration. One end of the union tee is connected to the flow-through cell according to an embodiment. Connected at the other two ends of the union tee are the temperature detector electrical connection and the ORP probe connection. Though any suitable union tee may be used, a preferred union tee is Part No. SS-200-3-4TMT (available from Swagelok® in Solon, Ohio).

Figure 5:
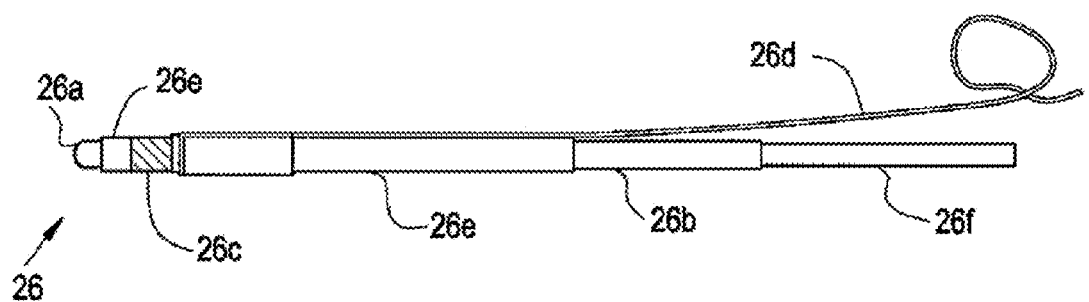
FIG. 5 illustrates an embodiment of the sensor 26 of FIG. 3.

FIG. 5 depicts an embodiment of sensor 26 having temperature detector 26a (at the "tip" of the sensor), insulating heat shrink 26b, noble metal band 26c, wire 26d, anchoring heat shrink 26e, and tube 26f. In this embodiment, tube 26f is a one end closed stainless steel tube having an outside diameter of about ⅛ inch and extending from about the center of the flow-through cell into the union tee. It should be appreciated that the tube may be of any suitable diameter, as determined for each application. The tube functions to provide support for noble metal band 26c ("band") and may include any corrosion-resistant material, such as stainless steel of any suitable composition, aluminum, other metals and plastics, and combinations thereof. In a preferred embodiment, the band functions as a passive ORP sensor. The ORP of the sample water is measured on the passive surface relative to the reference electrode. The band is located, in an embodiment, near the center of the FTC (as explained above for FIG. 3) and is in direct contact with the aqueous stream.

In a preferred embodiment, the temperature detector is a temperature-dependent resistance sensor (such as a PT100, PT200, PT1000, CU10, NI120). In one embodiment, the temperature-dependent resistance sensor is encased within tube 26f and is not directly exposed to the aqueous stream. The temperature detector may also include a standard thermocouple (such as type J, K, T, or E) or other temperature-sensing device according to alternative embodiments. In an embodiment, sensor 26 includes both an ORP probe having a noble metal band and a temperature detector, which are combined into one integrated component. In one embodiment, the sensor includes a plurality of wires. For example, wire 26d may transmit the ORP signal and one or more other wires transmit temperature signal(s).

Figure 6:
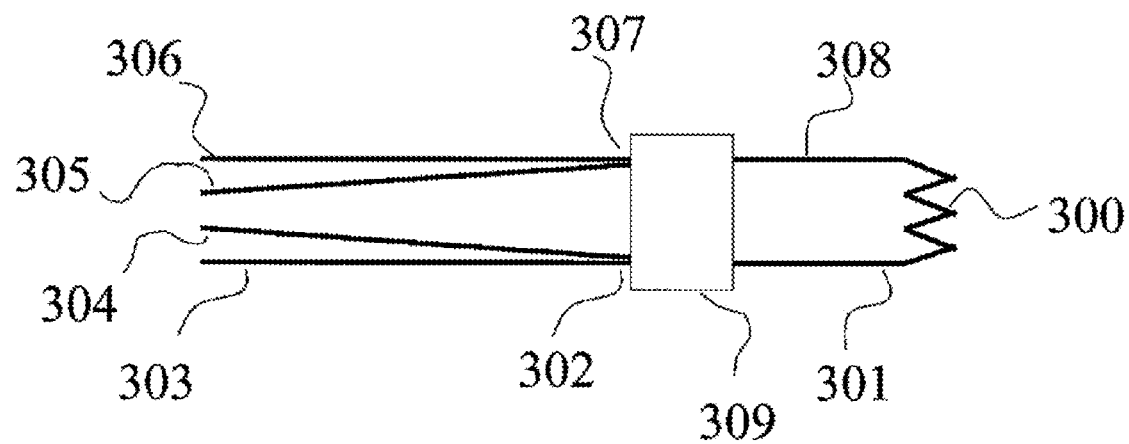
FIG. 6 depicts a preferred embodiment of a resistance temperature detector 300 of the ORP measuring device 10 of FIG. 2.

In a more preferred embodiment, the temperature detector includes a plurality of wires or electrical leads. Such a configuration overcomes errors introduced as a result of the inherent resistance of the electrical leads. FIG. 6 illustrates a resistance temperature detector with two positive electrical leads 303 and 304 and two negative electrical leads 305 and 306. Fitting 309 corresponds to BNC fitting 62a in FIG. 4. To ascertain temperature in the area about resistor 300, voltage (or current) is applied across the resistor, with the resulting voltage drop being used to determine temperature (as known in the art for resistance-based temperature detectors). Any deviations from the known voltage are related to changes in the resistance of resistor 300 as a function of temperature.

A configuration as in FIG. 6, where the resistance temperature detector includes a plurality of positive electrical leads and a plurality of negative electrical leads allows a user or controller to factor out inherent measurement errors. For example, measuring the voltage drop between positive electrical leads 303 and 304 and negative electrical leads 305 and 306 allows the controller to more accurately measure the voltage drop across any pair of positive/negative electrical leads. The resultant measurement provides an accurate reading of the voltage drop across resistor 300, which in turn provides a more accurate temperature reading.

In the embodiment depicted in FIG. 6, resistor 300 corresponds to temperature sensor 26a of FIG. 5. Positive electrical leads 303 and 304 connect to fitting 309 at point 302 and negative electrical leads 305 and 306 connect to fitting 309 at point 307. Positive lead 301 connects point 309 to resistor 300 and negative lead 308 connects point 307 to resistor 300.

Alternative configurations for the temperature detector may include one, two, or more temperature detectors used either independently or in conjunction with one another. For example, if two temperature detectors are employed, one detector may be used to monitor temperature near the FTC while the other monitors the temperature near the reference electrode. Such configurations allow the user or operator of the ORP device to evaluate and calculate thermal potentials that might exist along the length of the EPBRE. This data would then be used to correct and deconvolute ORP values with respect to temperature differentials and potentials.

Figure 7:
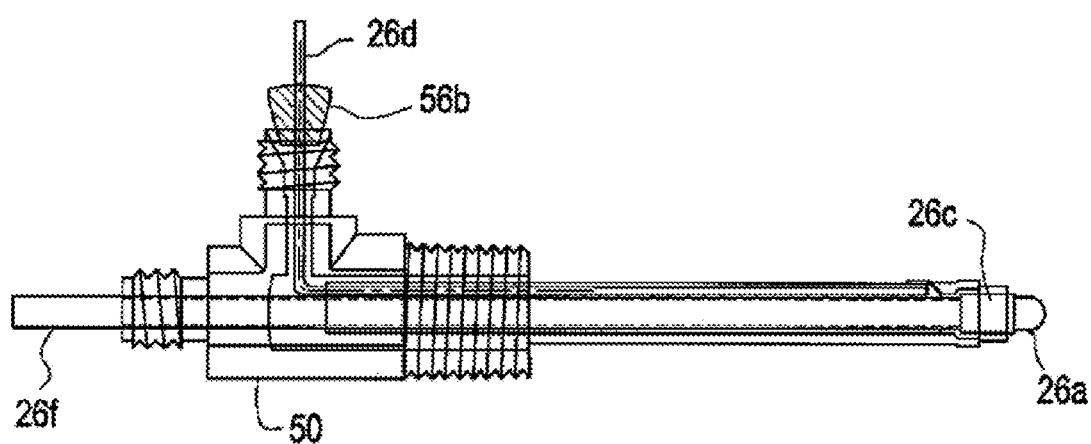
FIG. 7 is a cutaway view of the ORP measuring device 10 of FIG. 2.

The wire and band may include any noble metal, such as gold, silver, tantalum, platinum, rhodium, copper, and/or the like. Platinum is preferred. In an embodiment, any wire herein described may include an insulating material, such as plastic or a fluoroelastomer (as used herein throughout referring generally to fluoroelastomers such as PTFE, TFE, and FEP), wrapped around such wire. Wire 26d is connected to the band and transmits an electrical signal to anodic connection 58. In an embodiment, other wires (not shown) transmit an electrical signal to temperature detector electrical connection 54 from an "active" portion of a resistance temperature detector that resides within the closed end of the tube at tip 26a. FIG. 7 illustrates a detailed cutaway view of the spatial relationship between several described components according to a preferred embodiment. In one embodiment, the tail end of sensor 26 protrudes through the union tee and into the space on the opposite side of the union tee from the FTC (as shown in FIG. 7). In this embodiment, the active portion of the temperature-dependent resistance sensor is located within the tube 26f at tip 26a.

Figure 8:
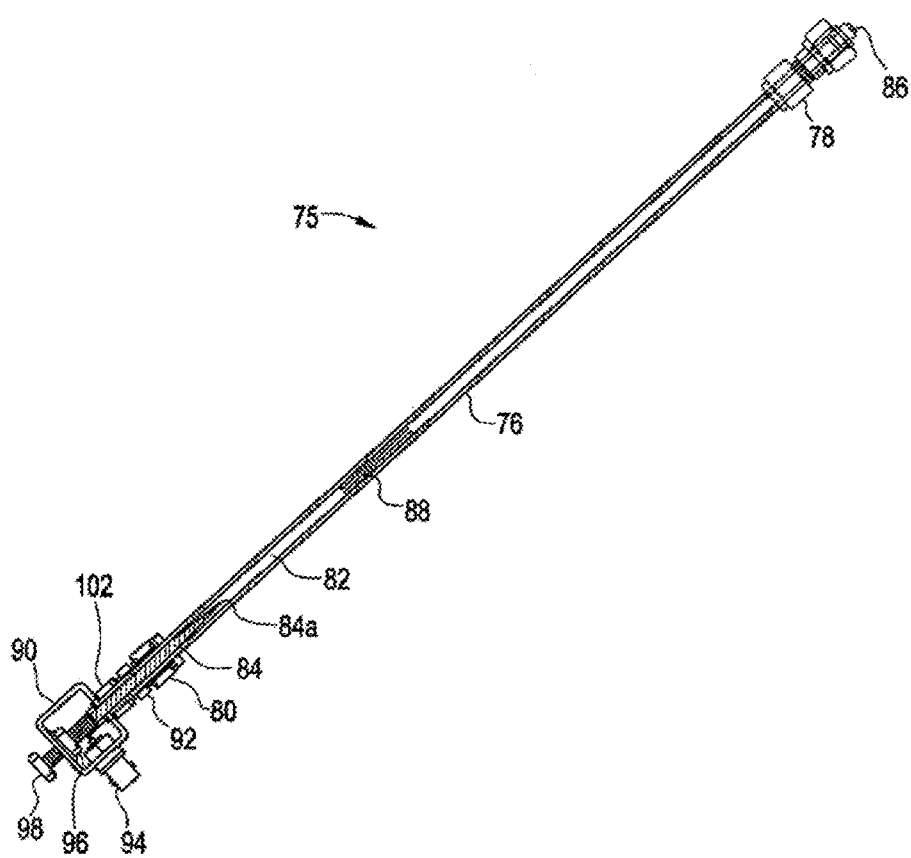
FIG. 8 depicts an embodiment of the external pressure-balanced reference electrode assembly 75 of FIG. 2, including external tube 76, high-pressure fitting 78, high-pressure connector 80, internal tube 82, reference electrode 84, porous frit 86, insert 88, multi-fitting housing 90, reducing union 92, BNC connector 94, locking nut 96, bolt 98, and fastener 102.

A preferred embodiment of the reference electrode includes EPBRE 75, which acts to encase and thermally isolate the reference electrode. Illustrated in FIG. 8 is an embodiment of EPBRE 75 including external tube 76, high-pressure fitting 78, high-pressure connector 80, internal tube 82, reference electrode 84, porous frit 86, insert 88, multi-fitting housing 90, reducing union 92, BNC connector 94, locking nut 96, bolt 98, and fastener 102. The external tube in this embodiment is a ⅛ to ½ inch inner diameter stainless steel tube and houses the internal tube. In an embodiment, the EPBRE includes one or more inserts 88, which function to allow the internal tube to be separated to refresh, check, replace, refurbish, etc. the electrolyte solution, as explained in more detail below.

It should be appreciated that the external tube, the internal tube, and insert may be made of any suitable material of any suitable size, such as stainless steel, aluminum, a fluoroelastomer, plastic, other suitable polymeric material, or other suitable metal. Preferably, the external tube is stainless steel (such as ¼ inch outside diameter 316 stainless steel tubing available from McMaster-Carr® in Elmhurst, Ill.) and the internal tube is a fluoroelastomer having a tight fit with the external tube. In this example, external tube 76 is about 5 to about 25 inches long. Preferably, the external tube is about 10 to about 20 inches in length. The length of the external tube acts to thermally isolate the reference electrode (within the EPBRE) from the hot water system while maintaining about equal pressure between the hot water system and the reference electrode. It is made from any suitable tubing material, and any suitable diameter or length may be used.

Figure 9:
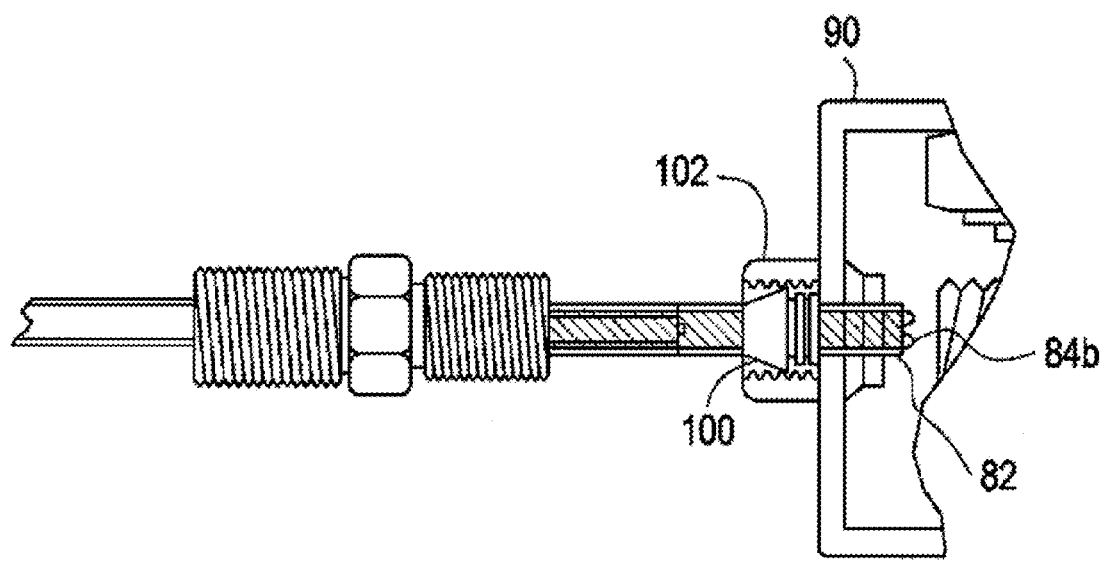
FIG. 9 shows an embodiment of the multi-fitting housing 90 of FIG. 8.

An embodiment for the multi-fitting housing or "base" of the EPBRE is illustrated in FIG. 9, which includes sealed junction 100, fastener 102, and reference electrode connection 84b of the reference electrode. The sealed junction preferably includes a non-metallic, multi-ferrule material. In this embodiment, the sealing material in the sealed junction comprises 3 separate fluoroelastomer ferrules secured with a 3/16 inch nut to the multi-fitting housing. An example of such a ferrule "assembly" includes Part No. T-303 and T-304 (available from Swagelok® in Solon, Ohio). In other embodiments, different types of seals and sealing materials may be used for the sealed junction. For example, the sealing material may include a gasket, elastomer, silicone, cork, flared fitting, rubber sleeve, o-ring, or any suitable seal or sealing material. In this embodiment, the ferrules function to place pressure on reference electrode 84, which is encased by the internal tube. Connector 80 is attached to reducing union 92 by, for example, standard stainless steel ferrules. The ferrules place pressure on the external tube thus holding it in place and providing a pressure-safe boundary.

The reference electrode is preferably about 2.5 to about 3.5 inches long and is tapered from tip 84a to sealed junction 100. In an embodiment, the reference electrode diameter remains constant from the sealed junction to reference electrode connection 84b. The reference electrode connection end is typically about 0.125 inches in diameter and the tip is typically about 0.01 inches in diameter. These diameters may be any suitable diameter according to alternative embodiments. The reference electrode (preferably a silver/silver chloride half-cell, where the tapered rod-shaped electrode includes silver with a silver chloride coating) extends from inside the internal tube (i.e., the tip is in contact with the electrolyte filling solution) to the end of the external tube and contacts the reference electrode connection. The reference electrode connection end includes a notch to accommodate a wire connecting the reference electrode to BNC connector 94 operable to transmit the electrical signal from the reference electrode to a receiver or controller, according to an embodiment. Bolt 98 acts to prevent the reference electrode from ejecting under system pressure and is typically made from any electrically isolating material, such as nylon, PVC, or other plastic.

In some embodiments, the ORP measuring device 10 is capable of measuring the reduction potential substantially in real time at a water temperature of 100° C. or higher. In further embodiments, the ORP measuring device 10 is capable of measuring the reduction potential substantially in real time at a water temperature of at least 110° C., at least 120° C., at least 130° C., at least 140° C., at least 150° C., at least 160° C., at least 170° C., at least 180° C., at least 190° C., at least 200° C., at least 210° C., at least 220° C., at least 230° C., at least 240° C., at least 250° C., at least 260° C., at least 270° C., at least 280° C., at least 290° C., at least 300° C., or at least 310° C.

In some embodiments, the ORP measuring device 10 is capable of measuring the reduction potential substantially in real time at a water pressure of 0.1 MPa or higher. In further embodiments, the ORP measuring device 10 is capable of measuring the reduction potential substantially in real time at a water pressure of at least 0.2 MPa, at least 0.3 MPa, at least 0.4 MPa, at least 0.5 MPa, at least 0.6 MPa, at least 0.7 MPa, at least 0.8 MPa, at least 0.9 MPa, at least 1 MPa, at least 2

MPa, at least 3 MPa, at least 4 MPa, at least 5 MPa, at least 6 MPa, at least 7 MPa, at least 8 MPa, at least 9 MPa, at least 10 MPa, at least 11 MPa, at least 12 MPa, at least 13 MPa, at least 14 MPa, at least 15 MPa, at least 16 MPa, at least 17 MPa, at least 18 MPa, at least 19 MPa, at least 20 MPa, at least 21 MPa, at least 22 MPa, at least 23 MPa, at least 24 MPa, at least 25 MPa, at least 26 MPa, or at least 27 MPa.

In some embodiments, the ORP measuring device 10 is capable of determining the pH of the hot water substantially in real time. For example, when a change in the performance in the hot water makeup system allows more or less sodium, phosphate, hydroxide, combinations of pH altering species to leak into the hot water, the pH value of the hot water may move up or down. The ORP measuring device 10 may detect substantially in real time such changes in pH values of the hot water that may be subtle and may be seen only later in a grab sample analysis. By detecting the pH changes quickly, and implementing a revised chemical dosage on an automated basis, improved control and an extended asset life span could be achieved.

Figure 10:
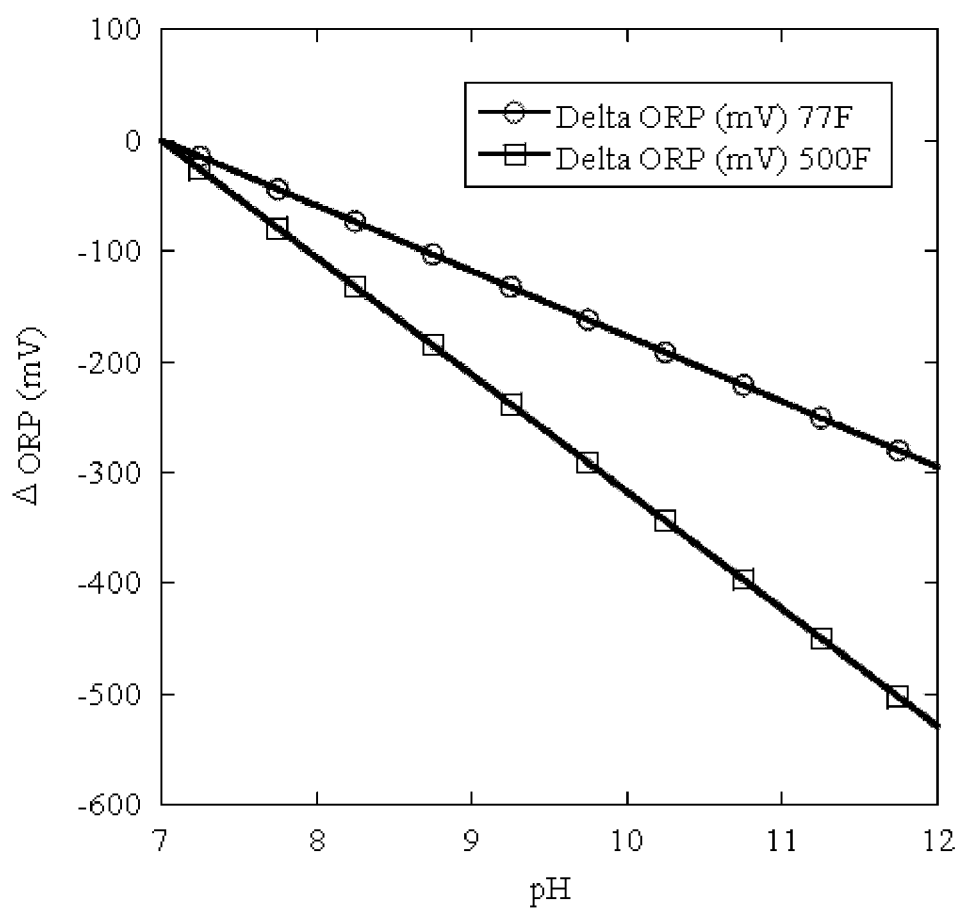
FIG. 10 is a graph plotting the ORP measured at various pH using the ORP measuring device 10 of FIG. 2.

Referring to FIG. 10, the ORP measured by the ORP measuring device 10 at operating temperature and pressure can be correlated to the pH of the water (measured at room temperature in this case). For example, increasing the room-temperature pH from 7 to 12 can result in decreasing the at-temperature ORP (measured at 260° C. or 500° F.) in an amount about 540 mV. In contrast, the ORP measured at room temperature decreases in an amount of about 300 mV for the same change in the pH. The room-temperature ORP change (about −300 mV in this case) is only about 56% of the at-temperature ORP change (about −540 mV in this case) for the pH change from 7 to 12. Thus, the at-temperature ORP measurement can provide greater resolution, clarity, and sensitivity compared to the room-temperature ORP measurement. Although FIG. 10 illustrates the correlation of ORP to the room-temperature pH, in other embodiments the ORP may be correlated to the at-temperature pH.

Referring also to FIG. 1, the ORP measuring device 10 may be positioned within the side stream or the blow-down line of the hot water system. For example, the ORP measuring device 10 may monitor the ORP before the FW Pump (at the sample point labeled "1" in FIG. 1), after the FW Pump and before the blowdown and sample stream (at the sample points labeled "2" or "3" in FIG. 1), or on the blowdown and sample stream (at the sample point labeled "4" in FIG. 1). The user-controlled positioning may allow local corrosion protection for a specific unit and/or groups of units, as well as global corrosion protection.

B) Controller Unit

As explained below, the controller, controller unit, or controller system 8 activates at least one water treatment chemical in response to the measured reduction potential so as to maintain a pH within a predetermined range. In one embodiment, the controller or controller system 8 is automated. In another embodiment, the controller 8 is manual or semi-manual, where an operator interprets the signals and determines feed water chemistry, such as oxygen or other oxidant, oxygen scavenger or other reductant, corrosion-inhibitor, corrodant dosage, and/or pH of the hot water. In an embodiment, the measured ORP signal is interpreted by the controller system 8 that controls FW chemistry according to the described method. In some embodiments, the controller system 8 is capable of generating an alert/alarm when the measured reduction potential changes by more than a predetermined amount. In further embodiments, the controller system 8 is capable of generating an alert/alarm when the measured reduction potential changes by more than a predetermined amount in a predetermined amount of time. As described above, the ORP measuring device 10 can provide greater sensitivity compared to room-temperature ORP measurements. In response to the at-temperature ORP measurement, the controller unit 8 can provide an early warning that the system is changing so as to potentially preempt deleterious effects of the change, such as deposit, corrosion, caustic gouging, or acid phosphate attack in the hot water system.

In an embodiment, the controller system 8 also interprets measured temperature to determine the amount of active chemical to add or remove, if any. The controller system 8 is also operable to determine if changing or adjusting a system parameter (for example boiler blow down or other system flow rates) is needed in addition to or instead of adding or removing one or more chemical species from the hot water system. The temperature detector might also be used for information purposes, such as in alarm schemes and/or control schemes. It should be appreciated that the control scheme may incorporate pump limiters, alarming, intelligent control, and/or the like, based off further inputs, such as pH, DO levels, and other water constituents/properties.

II) Method of Using the ORP Measurement and Monitoring System

A) Real-Time ORP Control

The invention is capable of detecting and reacting to both primary and secondary REDOX Stress events. Typically, the implementer knows the system corrosion control implications and possible REDOX stressors and is able to accordingly select one or more of the defined operational protective zones to appropriately monitor a given system's @T ORP space. In this way, it is possible to control corrosion by feeding or removing REDOX active species based off local and/or remote @T ORP readings as a primary REDOX Stress indicator. The @T ORP space is monitored and measured to assess and identify system demands, which are then compared to known/formulated metrics to react, solve, and control REDOX Stress events. As an indicator of secondary REDOX Stress, the invention can detect corrosion processes resulting from prior, primary REDOX Stress, where the primary REDOX stressor is no longer evident.

Conventional corrosion control regimes use one point feed. The disclosed invention uses targeted feed by precisely determining the needed active chemicals and the proper amount/dosage of those chemicals. For example, relatively oxidizing zones, such as low-pressure FW heaters (copper-based metallurgy), and more reducing zones, with high-pressure FW heaters (non copper-based metallurgy), may be differentiated to alleviate flow-accelerated corrosion-related issues. Relatively oxidizing conditions within all ferrous FW heaters at sections of pressurized water reactors versus relatively reducing final FW heater regimes for stress corrosion cracking mitigation in steam generators.

The ORP probe may detect several different factors that contribute to REDOX Stress events in the hot water system. For example, an ORP probe in a selected zone can act as a direct indicator of corrosion in that zone or in another zone. In an embodiment, the real-time ORP is measured in a first selected zone and one or more active chemical species are fed to the first selected zone, if the measured real-time ORP at the first selected zone or the calculated ORP does not conform to the ORP setting for the first selected zone. In another embodiment, the real-time ORP is measured at a first selected zone and one or more active chemical species are fed at one or more other selected zones, if the measured real-time ORP or the calculated ORP does not conform to the ORP setting for the first selected zone. In a further embodiment, one or more real-time ORPs are measured at one or more of the selected zones and one or more other real-time ORPs are calculated for one or more other selected zones, based upon one or more of the measured real-time ORP(s).

As described above, in some cases, the measured ORP in a first zone is used to calculate an ORP for another zone. Such calculations may be done by making various assumptions regarding system dynamics or by measuring temperature/water chemistry differences between zones. Using mixed potential theory and thermodynamic principles known to those skilled in the art also allows for approximating conditions in other zones. However, such calculations are typically subject to inherent inaccuracies; thus, the preferred method is to measure the real-time ORP in situ in selected zones.

Several important factors exist for determining or defining specific operational protective/control zones for a system. The goal for any particular system is to achieve @T ORP "Plant Specific Boiler Best Practices" for that system. For instance, certain plants are limited to certain chemistries due to control philosophy, environmental constraints, economics, industry standards, etc. System temperatures also may dramatically vary from one plant to another, which requires adjusting the specific control philosophy employed, explained in more detail in the below Examples. Different plants may also have a unique REDOX Stress baseline and insipient changes to the baseline may need to be determined.

Other factors include, specific ORP altering species purposefully added or inherently present; engineering alloys of construction for various portions/entities in the system; desired general and local corrosion mitigation; dosing limitations; other system design specifics; special considerations, such as flow-accelerated corrosion, stress, and corrosion cracking; system variability. Those skilled in the art would understand how to assess these and other system variables/specifics to implement the invention for a specific plant or system.

Ideally, any portion of a plant can have its @T ORP REDOX Stress measured and controlled using @T ORP. That is, the REDOX active species is fed directly to a specific piece of equipment (or groups of equipment) and the @T ORP of the water in that piece of equipment is measured in situ and controlled for corrosion mitigation. This invention more specifically addresses corrosion local to the part(s) being protected and transport of corrosion products with concomitant deleterious effects of that corrosion transport elsewhere in the system, including fouling, heat transfer surface coating, turbine deposition, etc. This type of full equipment monitoring and control approach is often not possible due to system limitations and economics. As such, parts of systems typically need to be handled as whole entities. In some cases, the entire feed water train of a boiler system might be the entity. Alternatively, only small portions of the system or groups of portions of the system are the entity. It is contemplated that any portion, component, or entity (including the entire system viewed as one entity) may be selected and monitored/controlled.

In an aspect, the ORP setting for one selected zone may overlap with another defined or selected zone. In another aspect, the ORP setting for one selected zone is completely independent of each and every other defined or selected zone. In a further aspect, the ORP setting for one selected zone is partially dependent upon factors in one or more other defined or selected zones.

In an embodiment, the ORP setting is determined for a first selected zone and additional ORP settings are optionally determined for additional selected zones, if any. In one embodiment, each additional ORP setting is independently determined. Alternatively, one or more of the ORP settings may be dependent upon one or more other ORP settings. ORP settings are generally dependent and based upon operational limitations of the hot water system.

Determining the ORP setting for any particular system may be accomplished by any suitable method. A preferred method is described in U.S. Pat. No. 7,666,312, "Method of Inhibiting Corrosion in Industrial Hot Water Systems by Monitoring and Controlling Oxidant/Reductant Feed through a Nonlinear Control Algorithm," which is incorporated herein by reference in its entirety. It is contemplated, however, that any method known to those skilled in the art may be employed to ascertain the ORP setting. In an embodiment, the ORP setting is an ORP set point that is chosen from one or more single values. In another embodiment, the ORP setting is an ORP set range chosen from one or more ranges of values. Over time, the ORP setting for any selected zone may be adjusted or changed. For example, a given plant may have a timetable outlining ORP settings for different parts/components of the system at different times. This timetable would typically be based upon operational factors in the system that may change as demands on the system change. Some zones might be kept relatively reducing and other zones might be relatively more oxidizing. The @T ORP control zones would be accordingly adjusted and monitored to compensate for these differences.

In one embodiment, one or more of the selected zones may be in a monitoring and/or alarm mode, while one or more other selected zones is in a control mode. A selected zone in a monitoring and/or alarm mode is capable, in an embodiment, of switching between these modes. Such switching may either be manually controlled or automatic. Several examples are presented below of how @T ORP system design can be used for REDOX stress control.

In another embodiment, the @T ORP is measured across any pump to detect pump or seal corrosion or failure. In another embodiment, the method may be used to detect heat exchanger tube leaks as one active chemical species might transfer through the leak in the heat exchanger to the other side (e.g., shell side to tube side or visa versa). Another example would be a surface condenser cooling water leak into a FW condensate hot well. In a further embodiment, the method may be used to detect any unwanted intrusion of external active chemical species (i.e., system contaminants). In an alternative embodiment, @T ORP can be used to form a "fingerprint" of specific REDOX stressors in a system. In this way, it can be used as an early warning system for boiler tube rupture as more boiler makeup water is added to the system from time to time with a concomitant increase in the REDOX stress.

In some embodiments, a suite of "fingerprint" signals may be measured in addition to the @T ORP, including, but not limited to, a rate of change of @T ORP, a statistical data scatter in @T ORP, @T ORP decay signals, and corrosion potential of engineering alloys. Based on such signals, REDOX altering chemical feed may be controlled via computer-based open-loop tuning or PID control algorithms in a hot water system. In further embodiments, the computer-based open-loop tuning or PID control algorithms may be applicable to any chemical system where a potential reading may be used to control the feed of chemicals for any reason.

Measured or calculated ORP values, and additional "fingerprint" signals may indicate amounts of electrochemically active species in one or more of the selected zones. Such an indication may either be directly seen in the zone where the ORP was measured or inferred in another zone where the ORP was not directly measured. In certain cases, the measured or calculated ORP and additional "fingerprint" signals may indicate an amount of chemical that indirectly affects an amount of electrochemically active species in one or more selected zones. In a more typical case, the electrochemically active species directly influences the measured or calculated ORP and additional "fingerprint" signals.

In one embodiment, the method includes ramping from one of the selected zones to another one of the selected zones after a triggering event. Any event that causes a shift or change in the real-time ORP and additional "fingerprint" signals in one or more control zones may be a triggering event. A person having ordinary skill in the art would be able to analyze such options and choose one or more triggering events for a system. For example, bringing pumps or other parts of the system online (or taking offline) may be a triggering event. Steam pressure changes due to downstream use changes, such as between turbine driving and other lower pressure uses, may also be chosen as a triggering event. Triggering may also be based on activating various condensate streams, which could introduce specific REDOX stressors in the system. Such triggering events could be detected by probes, relays, monitors, etc., while remaining detectable by changes in the real-time ORP in one or more control zones. Moreover, the rate of change of these and other events may dictate the ramping rate from one control zone to another control zone, including instantaneous, timed, step-wise, or other suitable ramping modes.

Representative triggering events may also include numerous timed operations or timetables or other plant dynamics. A timetable could be a fixed startup time followed by ramp up in some system operations over time. For example, 30 minutes after initiating FW flow, the real-time ORP should be within 100 mV of the desired ORP setting. After 20 minutes of full load firing of the boiler, the real-time ORP should be ramped up to the ORP setting. The ramping may also be triggered when an ORP setting has been achieved elsewhere in the system, such as upstream components. For example, once an upstream control zone has achieved its ORP setting (or is within, for instance, 50 mV), a downstream control zone is activated or brought into a control mode. Such sequencing of real-time ORP control is one preferred method of triggering.

Changing plant dynamics may also initiate triggering and/or ramping. In an embodiment, the triggering event can include plant power output changes. For example, a 5% power output decrease may be the triggering event that initiates real-time ORP changes in one or more control zones in the system. The procedure used to initiate the real-time ORP changes might be, for example, an immediate signal to change the ORP setting for one or more control zones or a gradual ramp to a new ORP setting. This procedure may be based upon the rate or magnitude of power decline. Furthermore, the triggering and/or ramping mechanisms might be complex interconnections of multiple signals and timing.

In a preferred embodiment, changes and adjustments to FW chemistry includes adding or removing (when possible) oxygen or other oxidant, oxygen scavenger or other reductant, corrosion-inhibitor, corrodant, and/or other active chemicals to the FW. By definition, oxygen scavengers are reducing agents, although not all reducing agents are necessarily oxygen scavengers. Reducing agents, suitable as oxygen scavengers, satisfy the thermodynamic requirements that an exothermic heat of reaction exists with oxygen. For practical applications, reasonable reactivity is typically required at low temperatures. That is, there should be some favorable kinetics of reaction. Furthermore, other changes and adjustments to FW chemistry, such as for system control and corrosion control may include adding/removing other oxidizing agents (oxidants), other reducing agents (reductants), and/or other active or inert chemicals.

It is also highly desirable that the reducing agent and its oxidation products are not corrosive and do not form products that are corrosive when they form in steam generating equipment. Typically, certain oxygen scavengers function optimally in certain pH ranges, temperatures, and pressures and are also affected by catalysis in one way or another. The selection of the proper oxygen scavengers for a given system can be readily determined based on the criteria discussed herein and knowledge of those skilled in the art.

Preferred reductants (i.e., oxygen scavengers) include hydrazine, sulfite, bisulfate, carbohyrazide, N,N-diethylhydroxylamine, hydroquinone, erythorbate or erythorbic acid, methyl ethyl ketoxime, hydroxylamine, tartronic acid, ethoxyquin, methyltetrazone, tetramethylphenylenediamine, semicarbazides, diethylaminoethanol, monoethanolamine, 2-ketogluconate, ascorbic acid, borohydrides, N-isopropylhydroxylamine, gallic acid, dihydroxyacetone, tannic acid and its derivatives, food-grade antioxidants, the like, and any combinations. It should be appreciated that any active chemical species may be used in the method of the invention.

Representative oxidants include oxygen, hydrogen peroxide, organic (alkyl and aryl) peroxides and peracids, ozone, quinone, acid and base forms of nitrates and nitrites, the like, and combinations.

Representative corrodants include mineral acids (e.g., HCl, $H_2SO_4$, $HNO_3$, $H_3PO_4$) and their salts/derivatives; caustics (e.g, Na, K, Li, hydroxides); ammonium hydroxide; chelants, such as EDTA, NTA, HEDP; phosphonic acid and polyphosphonic acids; phosphonates; water soluble and/or dispersable organic polymeric complexing agents, such as acrylic acid homopolymers, copolymers, and terpolymers; acrylamide; acrylonitrile; methacrylic acid; styrene sulfonic acids; the like; and combinations.

Representative corrosion inhibitors include alkali and amine salts of phosphate and polyphosphates; neutralizing amines; molybdates; tungstates; borates; benzoates; filming inhibitors, such as alkyl, alkenyl, and aryl polyamines and their derivatives; surfactant compositions, such as that disclosed in U.S. Pat. No. 5,849,220; oligomeric phosphinosuccinic acid chemistries, such as that disclosed in U.S. Pat. No. 5,023,000; the like; and combinations.

In another embodiment of the invention, one or more chemical species are removed from the hot water system. For example, oxygen may be removed from a main process water sidestream via a membrane process. Any suitable membrane may be used for such removal and one skilled in the art would select a suitable membrane and sidestream procedure. Nitrogen or a lower oxygen concentration carrier gas (or main process water sidestream) may be present on one side of a gas permeable membrane and the process water is on the other side of the membrane. The oxygen present in the main process water sidestream would diffuse out of the main process water sidestream to equilibrate its partial pressure across the membrane which would then lower the oxygen content in the main process water and lower the ORP. In an embodiment, a deaerator or similar deaeration process may be incorporated to mechanically remove or strip non-condensable gases (e.g., oxygen) out of the main system with counter flowing steam (having a lower dissolved oxygen value). The main system flow thus has its ORP lowered by the lowering of its inherent dissolved oxygen value. Such removal of chemical species may occur without or in conjunction with the addition of other chemical species into the hot water system.

In another embodiment of the invention, a non-chemical technique to change at least one system parameter may be used either alone or in conjunction with chemical addition/removal to adjust or conform the measured ORP. The ORP in any one actual zone (or linked zone) might be affected by non-chemical-addition techniques, upstream of the ORP control zone. Representative non-chemical techniques and system parameters include, for example, choosing a particular type of feed pump or condensate pump; partitioning flow of the system process stream; blending or combining streams; selecting materials of construction of various parts of the hot water system to control the rate of oxidation; cathodic protection; electromagnetic wave production; physical property changes; the like; and combinations thereof.

B) Real-Time pH Control

In some embodiments, the controller unit 8 activates at least one water treatment chemical in response to the measured reduction potential so as to maintain a pH within a predetermined range. The ORP measurement and monitoring system 6 can thus detect, determine, and deliver real-time pH control. In the detecting step, a reduction potential of a hot water is measured substantially in real time using the ORP measuring device 10. The ORP measurement and monitoring system 6 then determines a response.

In the delivering step, at least one water treatment chemical is activated in response to the measured reduction potential so as to maintain a pH within a predetermined range. Referring to FIG. 10, for example, if a room-temperature pH of 9-10 is desired, with a set point or target of 9.5, the at-temperature ORP control zone or space may be from about −200 mV to about −300 mV, with a set point or target of −250 mV. In some embodiments, the desired room-temperature pH may be at least 9.0, at least 9.1, at least 9.2, at least 9.3, at least 9.4, at least 9.5, at least 9.6, at least 9.7, at least 9.8, or at least 9.9. In further embodiments, the desired room-temperature pH may be no more than 10.0, no more than 9.9, no more than 9.8, no more than 9.7, no more than 9.6, no more than 9.5, no more than 9.4, no more than 9.3, no more than 9.2, or no more than 9.1. To achieve the desired room-temperature pH, the at-temperature ORP control zone or space may be set or targeted to be at least −300 mV, at least −290 mV, at least −280 mV, at least −270 mV, at least −260 mV, at least −250 mV, at least −240 mV, at least −230 mV, at least −220 mV, or at least −210 mV. In further embodiments, the at-temperature ORP control zone or space may be set or targeted to be no more than −200 mV, no more than −210 mV, no more than −220 mV, no more than −230 mV, no more than −240 mV, no more than −250 mV, no more than −260 mV, no more than −270 mV, no more than −280 mV, or no more than −290 mV.

Figure 11:
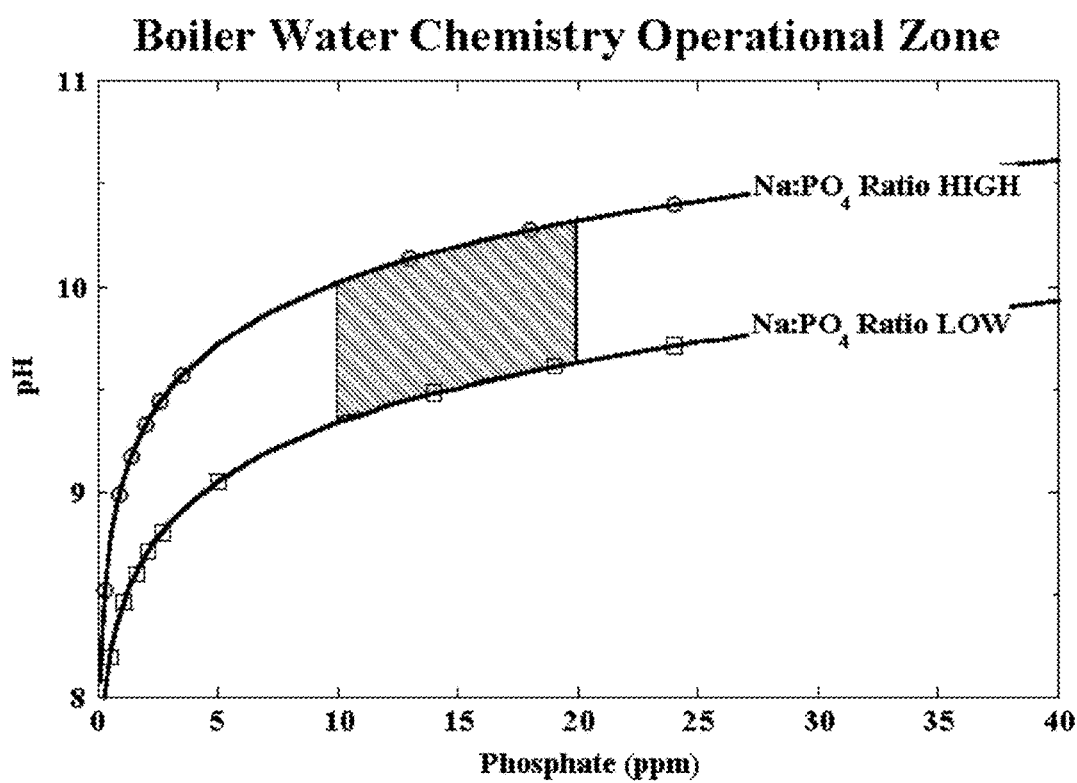
FIG. 11 is a graph plotting a pH control zone of the ORP measurement and monitoring system of FIG. 1.

Also referring to FIG. 11, a pH control zone is illustrated with hatching (roughly a parallelogram). To maintain the pH within a desired predetermined range, water treatment chemicals such as phosphate or other pH altering species are used or fed into the hot water. In some embodiments, the water treatment chemicals also include sodium (sodium hydroxide), and the sodium and the phosphate are added together to the hot water. In other embodiments, however, the sodium and the phosphate are added separately to the hot water. In further embodiments, at least one inert tracer molecule for measuring a concentration of a phosphate, and the controller unit 8 activates the feed of the water treatment chemicals in response to the measured concentration of the phosphate so as to maintain the pH within the predetermined range at the measured concentration of the phosphate and sodium to phosphate ratio.

By activating the water treatment chemical in response to the at-temperature ORP rather than the room-temperature ORP, reaction time can be quicker (down to 10 s or minutes based on sample flow and water sample conditioning apparatus like sample lines, coolers etc., thus avoiding undesirable boiler water chemistry), and excessive unwanted chemical usage may be substantially avoided. Although FIG. 11 illustrates the correlation of phosphate values to room-temperature pH, in other embodiments the phosphate values may be correlated to the at-temperature pH. Phosphate values might also be correlated to TRASAR® values.

C) Applications

1) Hot Water/Boiler System

In some embodiments, the disclosed ORP measurement and monitoring system 6 may be used in a variety of hot water systems, including both direct and satellite active chemical feeding designs. "Direct" feeding typically refers to measuring real-time ORP at a zone and feeding active chemical to the same zone. "Satellite" feeding usually refers to measuring real-time ORP at a zone and feeding active chemical to a different zone. Representative systems and system components include condensers, both tube and shell side; heat exchangers; pumps; seals; mild steel or copper-based FW heaters; copper-based alloy surface condensers; dearators; water tube and fire tube boilers; paper machines; condensate receivers; steam condensate transfer lines with or without steam traps; process liquid heat exchangers; evaporators; desalination systems; sweet-water condensers; attemperated water sources; flow-accelerated corrosion protection; air heaters; engine coolant systems for diesel and gasoline; and the like.

2) Papermaking System

In some embodiments, the disclosed ORP measurement and monitoring system 6 may be used in a variety of papermaking processes, such as Kraft pulping and bleaching processes; wafer polishing and planarization processes (e.g., silicon wafer polishing); combustion gas emission (e.g., $SO_2$, $NO_X$, mercury); fermentation processes; geothermal processes; and aqueous organic REDOX synthesis (i.e., polymerization processes that require REDOX initiators).

3) Oil Extraction System

In some embodiments, the disclosed ORP measurement and monitoring system 6 is applicable to water purification in an oil extraction process. Oil is produced as an emulsion containing water. The water can be separated from the oil and used for processes such as steam generation. The steam may be useful for injection into oil-bearing formations, thereby increasing the rate of oil production. Water produced with oil may require purification before it can be used for other processes such as steam generation. Sulfide ion is an impurity commonly found in water produced from the oil extraction process. Sulfide ion can produce odorous and potentially toxic hydrogen sulfide gas. However, the sulfide ion can be destroyed by adding hydrogen peroxide to the hot water, optionally with a catalyst. To assure complete destruction of the sulfide ion, hydrogen peroxide may need to be added in excess. However, adding a large excess of hydrogen peroxide can be wasteful and potentially cause problems with corrosion of the metal equipment used to process the water stream. Thus, careful control of the hydrogen peroxide addition can be desirable. In some embodiments, at-temperature ORP measurement can be used to control the addition of hydrogen peroxide. The at-temperature ORP measurement may facilitate a rapid response to changes in the water stream, and potentially result in reducing waste of hydrogen peroxide, thereby increasing the efficiency of sulfide destruction.

The foregoing may be better understood by reference to the following examples, which are intended for illustrative purposes and are not intended to limit the scope of the invention or its application in any way.

III) Examples

Example 1

Figure 12:
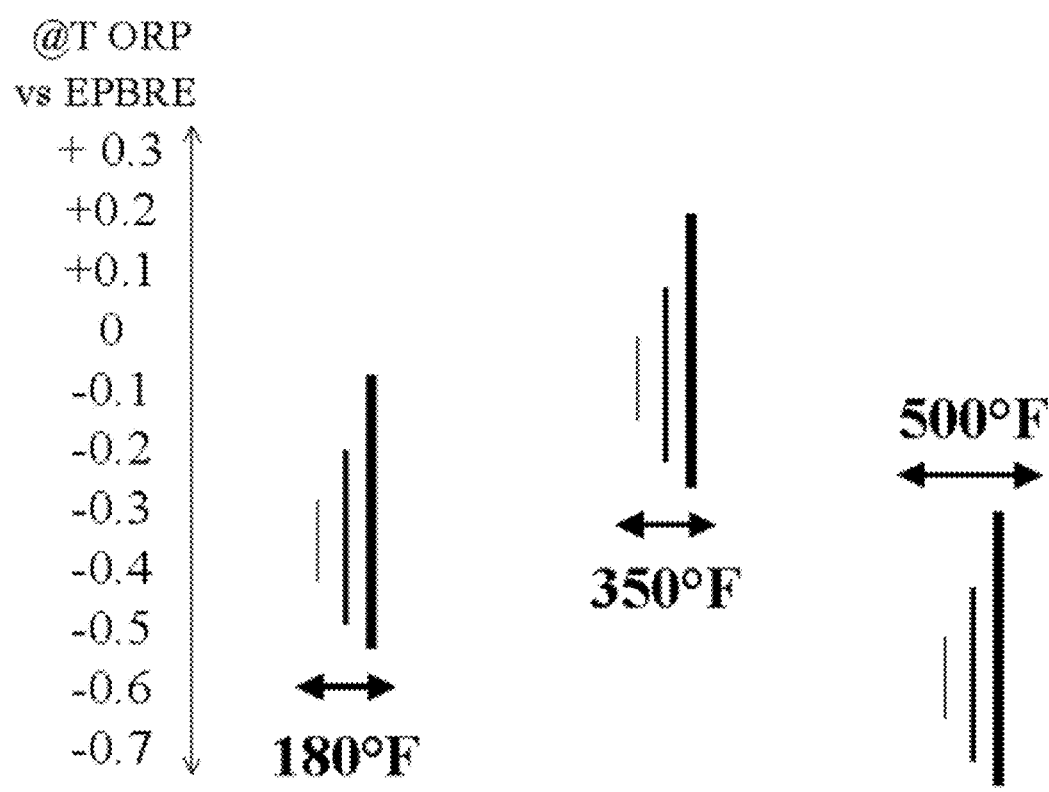
FIG. 12 depicts various "ORP Control Zones," where the ORP setting of the ORP measuring device 10 of FIG. 2 may be different for systems at various temperatures.

FIG. 12 depicts how the ORP setting may be different for systems at different temperatures. The temperatures shown in FIG. 12 may represent, for example, different plants or different operational protective/control zones in the same plant. In this Example, the ORP setting is an ORP set range selected from a series of ranges, shown as vertical lines labeled "Preferred," "Broader," and "Broadest." Depending upon the sophistication of equipment in the plant (i.e., operational limitations), the useable ORP set range or point may vary. That is, some plants are able to handle a narrow, or preferred, ORP set range, whereas other plants are able to handle only a broader ORP set range. The @T ORP numbers would typically be recorded against an external pressure balanced reference electrode (designated as "EPBRE" in FIG. 12) having 0.1 normal potassium chloride filling solution.

Example 2

Figure 13:
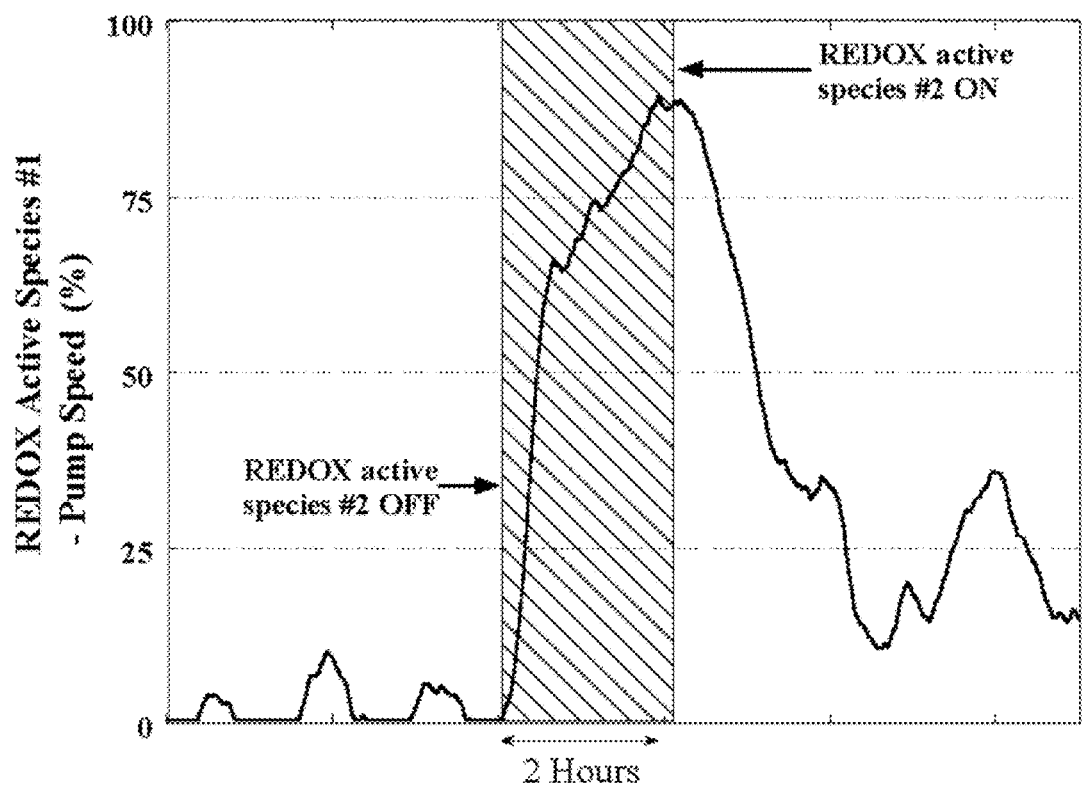
FIG. 13 illustrates feeding multiple REDOX active species at various locations to control the @T ORP (trademark of Nalco Company) at a single location of the ORP measurement and monitoring system of FIG. 1.

This Example illustrates feeding multiple REDOX active species at various locations to control the @T ORP at a single location, as shown in FIG. 13. The controlling @T ORP probe was placed directly upstream of the feed location for REDOX active species #2. The @T ORP probe was used to measure the @T ORP prior to the feed of REDOX active species #2. The @T ORP probe was then switched to control the feed of another REDOX active species (#1), being fed upstream of the single @T ORP probe. It should be noted that when REDOX active species #2 (that was being manually controlled) was turned off, the effect of that loss quickly permeated the plant water chemistry and was sensed by the @T ORP probe. The controller (in this Example, the controller was automated for REDOX active species #1) immediately initiated additional feed of REDOX active species #1 to make-up for the shortfall in REDOX active species #2.

The controlled feed of REDOX active species #1 was able to achieve and maintain the @T ORP setting thus minimizing corrosion in the heat exchangers during this event. Note that as soon as the REDOX active species #2 was manually turned back on, the corrosion control device (i.e., the @T ORP probe system) immediately compensated by cutting feed of REDOX active species #1 to maintain the desired @T ORP setting for corrosion control.

Example 3

This Example illustrates an unpredicted response of the @T ORP probe to measure corrosion events directly and how real-time ORP measurements act as a direct indicator of corrosion in hot water systems from REDOX Stress events.

The @T ORP probe reacts to the formation of corrosion products in the FW. The REDOX stresses in the FW include the complex conjugate ionic corrosion pairs like $Fe^{2+}/Fe^{3+}$ or $Cu^{+}/Cu^{2+}$, for example. In an all iron-based FW heater, water of high DO (i.e., greater than 500 ppb) starts to enter the FW heater. The room temperature ORP and real-time ORP at the heater inlet were initially −125 mV and −280 mV, respectively. On experiencing the added REDOX stress event, the room temperature ORP and real-time ORP at the heater inlet rose to −70 mV and −30 mV, respectively. The sensitivity of the @T ORP probe (real-time ORP increases 250 mV) is clearly seen as compared to the room temperature ORP probe (increased only 55 mV). The real-time and room temperature ORP probes at the FW heater exit were initially −540 mV and −280 mV, respectively. After the high REDOX stress event the real-time and room temperature ORP probes at the FW heater exit became −140 and −280 mV, respectively. It is important to note that the real-time ORP rose by 400 mV, whereas the room temperature ORP showed no change.

It is not intended to be bound to any particularly theory; however, one theory that the room temperature ORP measurements at the exit of the FW heater showed no change was that the DO exiting the FW heater remained unchanged throughout the DO ingress event at the inlet of the FW heater. The reason the real-time ORP numbers rose so dramatically at the FW heater exit was most likely because of the corrosion that had occurred in the FW heater itself. This event generated a plentiful supply of ionic oxidized iron species, which the @T ORP probe detected, but the room temperature ORP probe did not.

The same effect was seen across copper based FW heaters where the dissolved oxygen was consumed within the FW heaters. Once again, room temperature ORP measurements showed no change at the exit of the FW heaters, but @T ORP probe responses showed elevated numbers as oxidized copper ionic species (conjugate pairs) were released into the FW and exited the FW heater, only to be sensed by the @T ORP probes and not the room temperature ORP instruments.

Example 4

Non-Chemical Techniques

The paragraphs below provide several examples of non-chemical techniques to change a system parameter that could be used to control measured ORP in a hot water system. One of skill in the art would be able to utilize these techniques without undue experimentation.

Pump Choice: Pumps can be notoriously bad actors for air ingress (often an undesirable affect) and can add to REDOX stress in systems. Depending on whether such ingress was desired or conversely its exclusion was desired the choice of feed pump or condensate pump type could affect the ORP measurements quite drastically. For example, pump design parameters, such as piston packing, check valves, diaphragms, seals, glands, impellers, etc. are all zones of possible failure and air ingress. Air ingress typically occurs on the lower pressure side of a pump during the suction phase of pumping.

Partitioning: Stream flow and quantity can just be partitioned so that some or part of the system flow is diverted via sidestream to pieces of apparatus that can affect the inherent ORP and return it to the main system stream. For example, electrochemical ionization processes could be used to affect its chemical properties and thus ORP properties in the sidestream.

Blending: System or process streams with different ORP properties could be blended together in known/controlled/calculated ratios to affect the ORP and thus corrosion of the downstream system.

Materials: Separate sections of system made from different materials that could affect the ORP and corrosion properties could be incorporated and used in a specific combination to achieve the desired ORP for the hot water system. For example, a material that would have a great affinity for dissolved oxygen (e.g., any material that can actively oxidize, such as aluminum, chrome, the like, and combinations thereof, and even, more reactive would be lithium, sodium, magnesium, zinc, the like, and combinations thereof) to reduce locally the dissolved oxygen values in the process water by oxidizing at a controlled rate. Later in the process the water would then have lower ORP values and lowered propensity to corrode other materials which would then be better protected. This is somewhat similar to anodic protection except that in this case an entire zone, or piece of equipment, might be the anodic zone to protect a later zone from corrosive forces. One or more ORP-affecting species (e.g., a piece of hardware or system component) are added upstream from a later zone that requires specific ORP numbers for corrosion protection. While the pieces of hardware are generally thought to be metallic they need not be. For example activated carbon might prove to be an effective chemistry altering species, and thus ORP altering species as well.

Cathodic Protection: Impressed current similar to cathodic protection may be used to alter the ORP space whereby sections of equipment or zones contacting process water can be catholically protected. In one extreme case the cathodic protection could be run at high enough impressed electrochemical voltages to introduce chemical altering species, like hydrogen. Hydrogen would then in and of itself lower ORP values and could combine with oxygen locally (or downstream) to lower the measured ORP values.

Electromagnetic Waves: Pieces of apparatus could be in a zone of electromagnetic wave production, such as light sources, ultra-violet additions, microwave-inducing waves, the like, and combinations thereof. The electromagnetic wave sources could be on continuously or intermittently such as in a controlled fashion, pulsed, etc. The wave sources, via their specific action could be used to affect the ORP species either directly or indirectly in any zone. For example, UV light may activate a cobalt-catalyzed reaction between oxygen and sulfite in the water.

Physical Properties: Purposeful and localized changes in physical properties, for example temperature, pressure, flow, turbulence, and the like might be designed to locally affect the system ORP and thus the resultant corrosivity.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A system for monitoring and controlling corrosion in a hot water system, comprising:
   an oxidation-reduction potential probe capable of measuring a reduction potential of the hot water system substantially in real time;
   a controller unit operatively coupled to the oxidation-reduction potential probe, wherein the controller unit activates a feed of at least one water treatment chemical in response to the measured reduction potential so as to maintain a pH within a predetermined range; and
   at least one inert tracer molecule for measuring a concentration of a pH altering species, and wherein the controller unit activates the feed of the water treatment chemicals in response to the measured concentration of the pH altering species so as to maintain the pH within the predetermined range at the measured concentration of the pH altering species and sodium to pH altering species ratio.

2. The system of claim 1, wherein the oxidation-reduction potential probe is capable of measuring the reduction potential substantially in real time at a water temperature of 100° C. or higher.

3. The system of claim 1, wherein the oxidation-reduction potential probe is capable of measuring the reduction potential substantially in real time at a water pressure of 0.1 MPa or higher.

4. The system of claim 1, wherein the oxidation-reduction potential probe is capable of determining the pH of the hot water substantially in real time.

5. The system of claim 1, wherein the controller unit is capable of generating an alert/alarm when the measured reduction potential changes by more than a predetermined amount.

6. The system of claim 1, wherein the controller unit is capable of generating an alert/alarm when the measured reduction potential changes by more than a predetermined amount in a predetermined amount of time.

7. The system of claim 1, wherein the hot water is discharged or sampled via a blow-down line and/or a side stream, and the oxidation-reduction potential probe is positioned within the side stream or the blow-down line.

8. The system of claim 1, wherein the controller unit controls the feed of the water treatment chemicals to achieve a desired reduction potential.

9. A method of monitoring and controlling corrosion in a hot water system, the method comprising:
   measuring a reduction potential of the hot water substantially in real time using an oxidation-reduction potential probe;
   activating a feed of at least one water treatment chemical in response to the measured reduction potential so as to maintain a pH within a predetermined range; and
   measuring a concentration of a pH altering species using at least one inert tracer molecule, and wherein the water treatment chemicals are activated in response to the measured concentration of the pH altering species so as to maintain the pH within the predetermined range at the measured concentration of the pH altering species and sodium to pH altering species ratio.

10. The method of claim 9, wherein the reduction potential is measured substantially in real time at a water temperature of 100° C. or higher.

11. The method of claim 9, wherein the reduction potential is measured substantially in real time at a water pressure of 0.1 MPa or higher.

12. The method of claim 9, wherein a pH of the hot water is determined substantially in real time using the oxidation-reduction potential probe.

13. The method of claim 9, further comprising generating an alert/alarm when the measured reduction potential changes by more than a predetermined amount.

14. The method of claim 9, further comprising generating an alert/alarm when the measured reduction potential changes by more than a predetermined amount in a predetermined amount of time.

15. The method of claim 9, wherein the hot water is discharged or sampled via a blow-down line and/or a side stream, and wherein the method further comprises positioning the oxidation-reduction potential probe within the side stream or the blow-down line.

16. The method of claim 9, wherein the feed of the water treatment chemicals is controlled to achieve a desired reduction potential.

17. The method of claim 9, wherein the hot water is fed from a feed-water pump to a boiler, and wherein the inert tracer molecule is added to the boiler or before the boiler and monitored before and/or after the boiler.

18. The method of claim 9, wherein the water treatment chemicals include sodium and a phosphate.

19. The method of claim 18, wherein the sodium and the phosphate are added together to the hot water.

20. The method of claim 18, wherein the sodium and the phosphate are added separately to the hot water.

* * * * *